United States Patent
Jain et al.

(10) Patent No.: US 9,042,272 B2
(45) Date of Patent: May 26, 2015

(54) DISTRIBUTED PROXY ADDRESSING OPERATIONS

(75) Inventors: Vipin Jain, San Jose, CA (US); Sukhesh Halemane, San Jose, CA (US); Mahidas Prabhanjan, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 353 days.

(21) Appl. No.: 13/602,922

(22) Filed: Sep. 4, 2012

(65) Prior Publication Data

US 2014/0064148 A1    Mar. 6, 2014

(51) Int. Cl.
H04L 12/28    (2006.01)
H04L 12/741   (2013.01)

(52) U.S. Cl.
CPC .............. *H04L 12/28* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 6,603,769 B1* | 8/2003 | Thubert et al. | 370/401 |
| 7,512,136 B2* | 3/2009 | Korotin | 370/401 |
| 2002/0112076 A1* | 8/2002 | Rueda et al. | 709/245 |
| 2003/0142684 A1* | 7/2003 | Miyachi | 370/401 |
| 2004/0054799 A1* | 3/2004 | Meier et al. | 709/230 |
| 2006/0062187 A1* | 3/2006 | Rune | 370/338 |
| 2007/0064691 A1* | 3/2007 | Cetin et al. | 370/389 |
| 2007/0097919 A1* | 5/2007 | Tsubota | 370/331 |

OTHER PUBLICATIONS

Dunbar, et al. "BCP for ARP-ND Scaling for Large Data Centers," Internet Engineering Task Force (IETF), Jan. 3, 2012, pp. 1-12.
Narten, et al., "Problem Statement for ARMD," Internet Engineering Task Force (IETF), Internet-Draft, Mar. 12, 2012, pp. 1-16.
McBride, et al., "Multicast in the Data Center Overview," Internet Engineering Task Force (IETF), Mar. 10, 2012, pp. 1-11.
"Address Resolution for Massive numbers of hosts in the Data center (armd)," http://datatracker.ietf.org/wg/armd/charter/, May 23, 2012, pp. 1-2.

* cited by examiner

*Primary Examiner* — Brian Roberts
(74) *Attorney, Agent, or Firm* — Edell, Shapiro & Finnan, LLC

(57) ABSTRACT

An addressing redirection mechanism is initiated at a switch or a router in a computing network in order to enable the switch to perform one or more distributed proxy addressing operations on behalf of a connected router. An address request transmitted from a first host device to a second host device to obtain addressing information of the second host device is received at the switch, and the switch inspects the address request to identify addressing information for the first host device. The switch is configured to forward the addressing information for the first host device to the router.

29 Claims, 6 Drawing Sheets

DISTRIBUTED PROXY ADDRESSING OPERATIONS

TECHNICAL FIELD

The present disclosure relates to the use of the proxy addressing operations in a computing network.

BACKGROUND

The Address Resolution Protocol (ARP) is used to connect together the various networking layers within a computing network (e.g., to connect the Internet Protocol (IP) and Ethernet networking layers). Since networking hardware such as switches, hubs, routers, and bridges operate on, for example, Ethernet frames, these devices are unaware of the higher layer data carried by these frames. Similarly, IP layer devices, operating on IP packets, need to be able to transmit their IP data on the Ethernet layer. The ARP defines the mechanism by which IP capable hosts can exchange mappings of their Ethernet and IP addressing. The ARP is used primarily used in conjunction with IP Version 4 (IPv4).

More specifically, the ARP may be used to map IP addresses to a host address (i.e., a Media Access Control (MAC) address) that is recognized in the local network. For example, in IP Version 4 (IPv4), an IP address may be 32 bits long, but the Ethernet local area network (LAN) MAC addresses may be 48 bits long. A table, referred to herein as the ARP cache or ARP table, is used to maintain a correlation between each MAC address and its corresponding IP address.

The Neighbor Discovery Protocol (NDP) is another protocol in the Internet Protocol suite that is used in conjunction with Internet Protocol Version 6 (IPv6). The NDP is used for, among other tasks, discovery of other nodes and determined the addresses of the other nodes. In IPv6, the NDP is substantially the equivalent of the ARP used in IPv4.

DESCRIPTION OF EXAMPLE EMBODIMENTS

Overview

Techniques are provided herein for enabling distributed proxy addressing operations in a computing network. A router initiates an addressing redirection mechanism that enables the switch perform the proxy addressing operations on behalf of a connected router. An address request is transmitted from a first host device to a second host device. This address request is received at the switch and the switch inspects the address request to determine the addressing information for the first host device. The switch is configured to forward the addressing information for the first host device to the router. These techniques may be embodied in a device/apparatus, a methodology, and/or in computer readable storage media that stores instructions executable by a processor.

Example Embodiments

Figure 1:
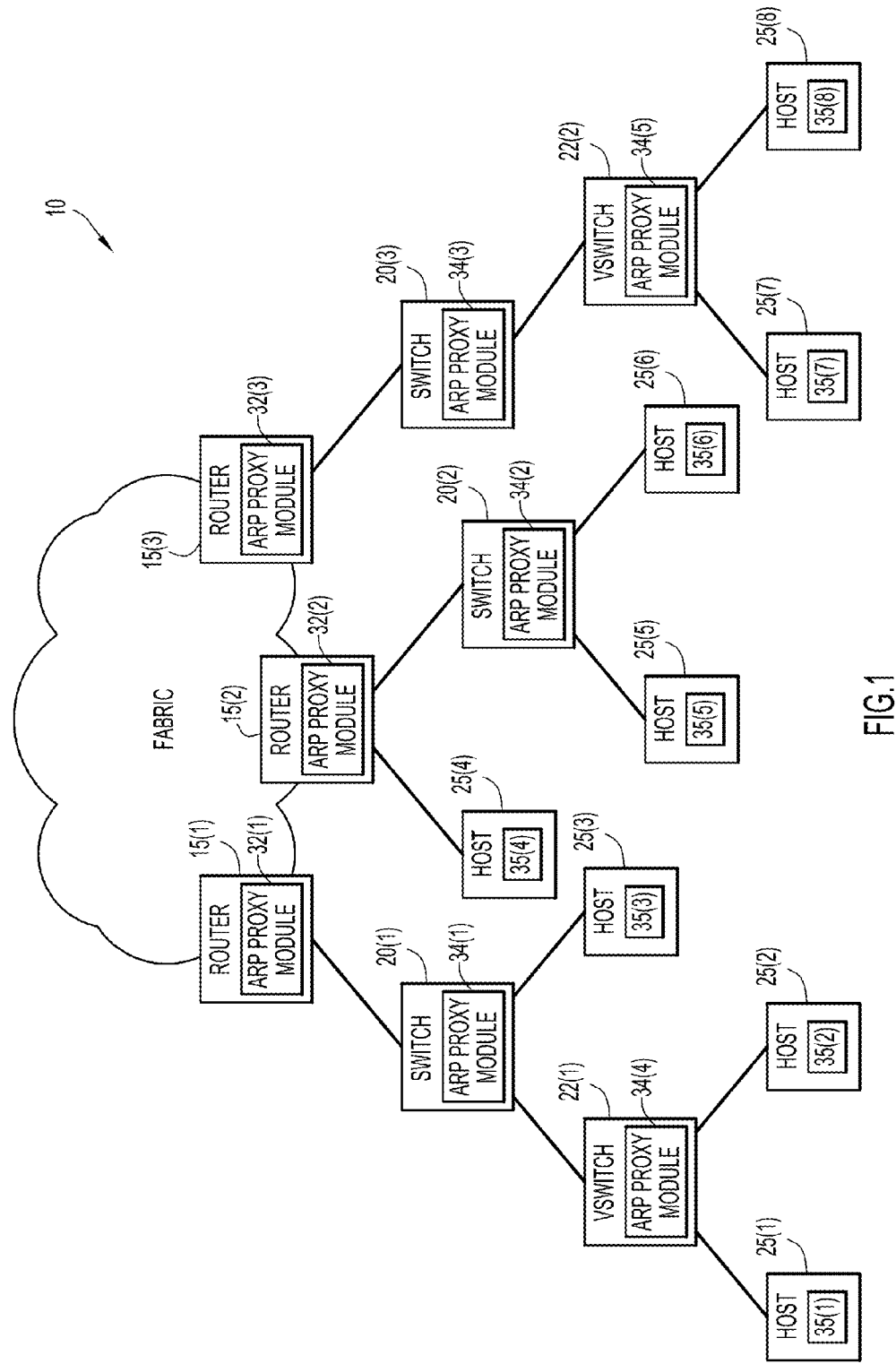
FIG. 1 is a schematic diagram of a computing network in which real and virtual switches are configured to perform proxy addressing operations on behalf of a connected router.

FIG. 1 is a schematic diagram of a computing network 10 that comprises routers 15(1)-15(3), physical switches 20(1)-20(3), virtual switches (vSwitches) 22(1) and 22(2), and host devices (hosts) 25(1)-25(9). Switches 20(1), 20(2), and 20(3) are each directly connected to a router 15(1), 15(2), and 15(3), respectively. Virtual switches 22(1) and 22(2) are connected to routers 15(1) and 15(3) through switches 20(1) and 20(3), respectively. Hosts 25(1) and 25(2) are connected to switch 20(1) via virtual switch 22(1), while host 25(3) is connected directly to switch 20(1). Host 25(4) is connected directly to router 15(2) and hosts 25(5) and 25(6) are connected to switch 20(2). Hosts 25(7) and 25(8) are connected to switch 20(3) via virtual switch 22(2).

Hosts 25(1)-25(8) may be, for example, computers, servers, virtual machines, etc. It is to be appreciated that the architecture of computing network 10 shown in FIG. 1 is merely one example arrangement and that the techniques described herein may be used in other networks having different arrangements.

The computing network 10 is divided into a plurality of virtual local area networks (VLANs) (not shown in FIG. 1). As defined in the Institute of Electrical and Electronics Engineers (IEEE) Standard 802.1Q, VLANs are independent broadcast domains within the same physical network 10. The VLAN boundaries are not specific to a set of switches connected to a router, but rather the VLANs may span across multiple switches and across routers (i.e., across routing boundaries).

The Internet Protocol (IP) suite is a set of communications protocols used for the Internet and similar networks. The IP suite is commonly known as TCP/IP, because of its most important protocols, namely the Transmission Control Protocol (TCP) and the Internet Protocol. TCP/IP provides end-to-end connectivity specifying how data should be formatted, addressed, transmitted, routed, and received at a destination device. It has four abstraction layers, each with its own set of protocols. These layers include: (1) the link layer (commonly referred to as Ethernet) that includes the communication technologies for a local network; (2) the Internet layer (e.g., using IP) that connects the local networks, thus establishing internetworking; (3) the transport layer (e.g., using TCP) that handles host-to-host communication; and (4) the application layer that contains all protocols for specific data communications services on a process-to-process level.

The link layer is the networking scope of the local network to which a host (e.g., virtual machine) is attached. The link layer is used to move packets between the Internet layer interfaces of two different hosts on the same link. The Internet layer has the responsibility (potentially) of sending packets across multiple networks. Internetworking includes sending data from a source network to a destination network, referred to herein as routing. In the Internet Protocol suite, the IP performs two basic functions, namely host addressing and identification and packet routing.

A number of different versions of the Internet Protocol have been developed. In particular, Internet Protocol version 4 (IPv4) is the fourth revision in the development of the Internet Protocol (IP) and the first version of the protocol to be widely deployed. Together with Internet Protocol version 6

(IPv6), it is at the core of standards-based internetworking methods of the Internet. In accordance with examples described herein, a number of different protocols may be used for the network-assisted updating of addressing information. For example, the Address Resolution Protocol (ARP) may be used in networks implemented in accordance with IPv4, while the Neighbor Discovery Protocol (NDP) may be used in networks executed in accordance with IPv6. For ease of reference, the distributed proxy addressing techniques will be primarily described with reference to use of the ARP. However, it is to be appreciated that these techniques are also applicable to the NDP and other protocols typically used to distribute addressing information in a network.

In the example of FIG. 1, computing network 10 is an IPv4 network and each host 25(1)-25(8) has an assigned link layer address, referred to as an Ethernet address, Media Access Control (MAC) address, or hardware address (collectively and generally referred to herein as MAC addresses). However, the Internet layer uses IP addresses (i.e., logical addresses assigned to hosts) for traffic routing. As such, the ARP is used to connect the link and IP layers and provides a mechanism for converting between MAC addresses and IP addresses.

When hosts 25(1)-25(8) in network 10 initially communicate with each other, they perform an ARP resolution to cache their IP address to MAC address binding (conversion) in local ARP tables 35(1)-35(8), respectively. The hosts 25(1)-25(8) may subsequently use this information to communicate with one another.

In accordance with ARP operation, a first host will transmit a broadcast ARP request to determine the MAC address corresponding to the IP address of a second or destination host (i.e., to obtain the IP address to MAC address conversion information for the destination host). In conventional ARP techniques, the ARP request from the first host is forwarded through the network all the way to the destination host. The destination host will then transmit an ARP response that provides the first host with the requested MAC address.

In certain other conventional ARP techniques, ARP requests from the first host may be answered without forwarding the ARP request to the destination host. In these so-called "proxy" ARP operations, an intermediary device in the network will respond back to the ARP request from the first host on behalf of the destination host. More specifically, the intermediary device, referred to the ARP proxy, is aware of the location of the destination host and, instead of forwarding the ARP request to the destination host, the ARP proxy provides the first host with its own MAC address in reply (i.e., the MAC address of the ARP proxy). Because the ARP proxy provides its own MAC address in reply, the first host will associate the MAC address of the ARP proxy with the IP address of the destination host such that any future communications from the first host to the destination host will be transmitted to the ARP proxy. The ARP proxy then has the responsibility of forwarding all the future traffic received from the first host to the destination host. In essence, the ARP proxy pretends to be the destination host and will perform forwarding when it receives the packets from the first host. Routers generally operate as the ARP proxy as they are the only devices in the network that are aware of the locations (i.e., MAC addresses) of the various hosts.

In certain networks, such as data center networks, there may be a large number of hosts in the network and there may be multiple physical or virtual switches between a router and a host. FIG. 1 illustrates such an example in which hosts 25(1), 25(2), 25(5), 25(6), 26(7), and 25(8) are each connected to one of routers 15(1)-15(3) via two switches. In such an example, traffic may be forwarded locally between different hosts by the switches 20(1)-20(3) and/or virtual switches 22(1) and 22(2) without ever reaching routers 15(1)-15(3). When theses hosts communicate solely through one or more switches (i.e., without going through the routers), the routers 15(1)-15(3) will not receive any ARP requests from these switches, and the routers will not be aware of their location and MAC address information. Therefore, the routers 15(1)-15(3) are unable to operate as an ARP proxy for these hosts.

Presented herein are techniques in which ARP proxy functionality/operation is extended from the central ARP proxy to other network devices connected to the central ARP proxy, thereby forming a distributed ARP proxy arrangement. In the example of FIG. 1, the techniques extend the ARP proxy functionality from routers 15(1)-15(3) to one or more of switches 20(1)-20(3) and/or virtual switches 22(1) and 22(2).

There are, in general, two operations performed in the distributed ARP proxy techniques. These operations include the extended host discovery operation, and the extended ARP proxy operation. First, in conventional ARP proxy operation, the ARP proxy (i.e., router) first becomes aware of the destination host. This awareness is obtained through a host discovery process. A conventionally used host discovery process involves the router silently inspecting (snooping) initial ARP request messages to learn the locations of the various hosts. However, in the example of FIG. 1, two hosts may communicate with each other via a switch and any ARP requests transmitted there between will not be seen by the router. As such, the router cannot inspect these ARP requests to learn locations of the hosts. In the distributed ARP proxy techniques described herein, the switches 20(1)-20(3) and/or virtual switches 22(1) and -22(2) are configured to silently inspect the ARP requests and thus perform the host discovery on behalf of the routers 15(1)-15(3). After inspecting the ARP requests to obtain the ARP information, the ARP information may be communicated back to the routers.

Second, the routers 15(1)-15(3) are configured to notify/inform the switches 20(1)-20(3) and/or virtual switches 22(1) and 22(2) that they can perform the ARP proxy operations on behalf of the router (i.e., the routers authorize the switches to respond to ARP requests from locally connected hosts). In other words, for any ARP requests that a host sends, the locally connected switch will respond as the proxy agent on behalf of the router. The notification from a router to a switch will include a router MAC address (i.e., proxy MAC address) designated for the network that is to be used for proxying ARP requests by a switch on behalf of the routers.

The ARP response transmitted from a switch provides the requesting host with the MAC address communicated to the switch from the router (i.e., the router MAC address). Because the switch provides the router MAC address in reply, the requesting host will associate the router MAC address with the IP address of the destination host such that any future communications from the first host to the destination host will be transmitted towards the router MAC address. The requesting switch is provided with the network designated router MAC address so that a virtual machine or host can move around in the network beyond the connected switch and thus is not required to re-ARP and/or perform any correction. Therefore, this mechanism, in essence, allows the entire network to present itself as one single router (i.e., through a single router MAC address).

In the example of FIG. 1, the routers 15(1), 15(2), and 15(3) include distributed ARP proxy modules 32(1), 32(2), and 32(3), respectively. Switches 20(1), 20(2), 20(3), 22(1), and 22(3) each include a distributed ARP proxy module 34(1), 34(2), 34(3), 34(4), and 34(5), respectively, for execution of the distributed proxy addressing techniques. Further details regarding the distributed proxy addressing techniques, including the extended host discovery and extended proxy operations, are provided below.

Figure 2:
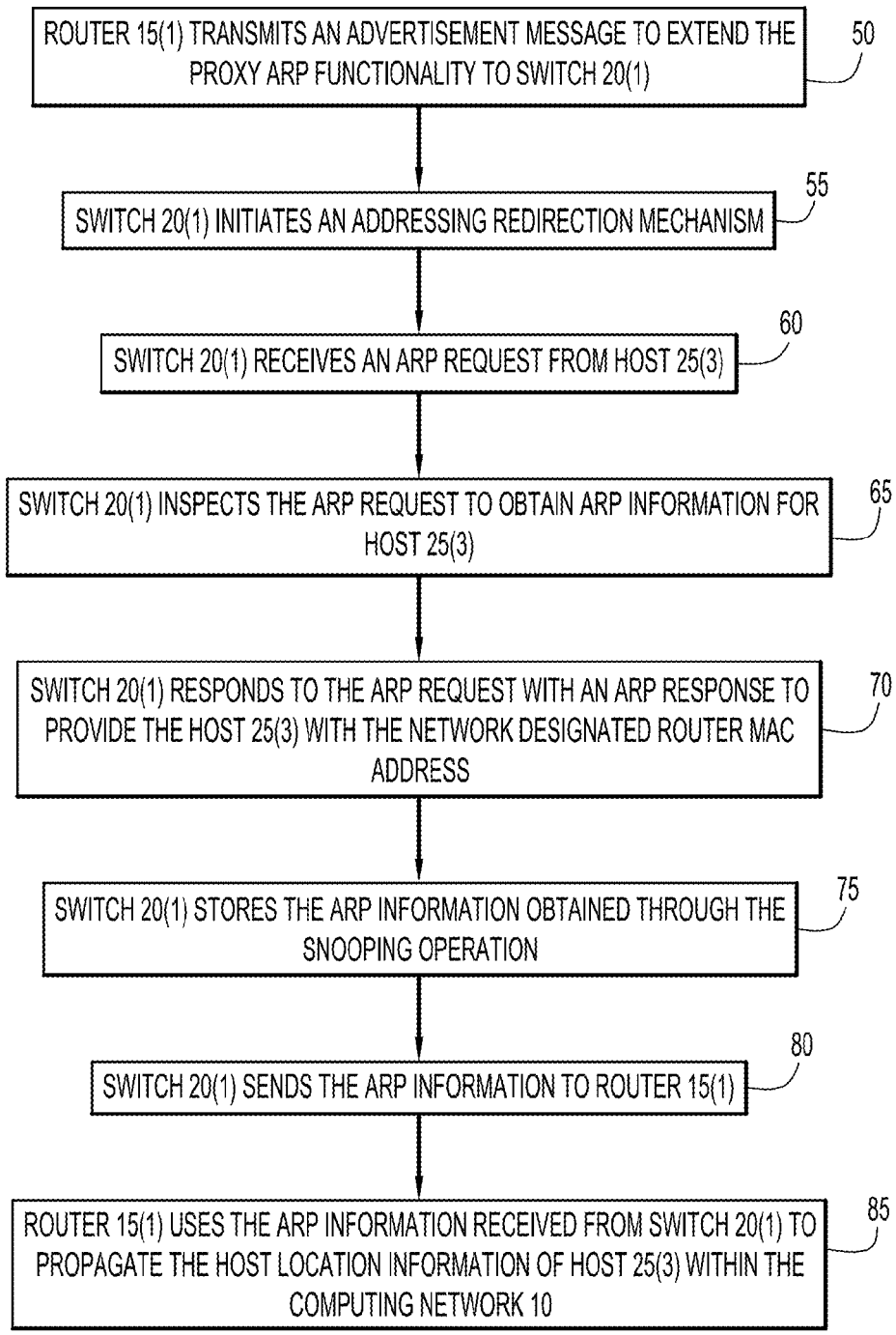
FIG. 2 is a detailed flowchart illustrating a method executed in accordance with examples described herein.
Figure 3:
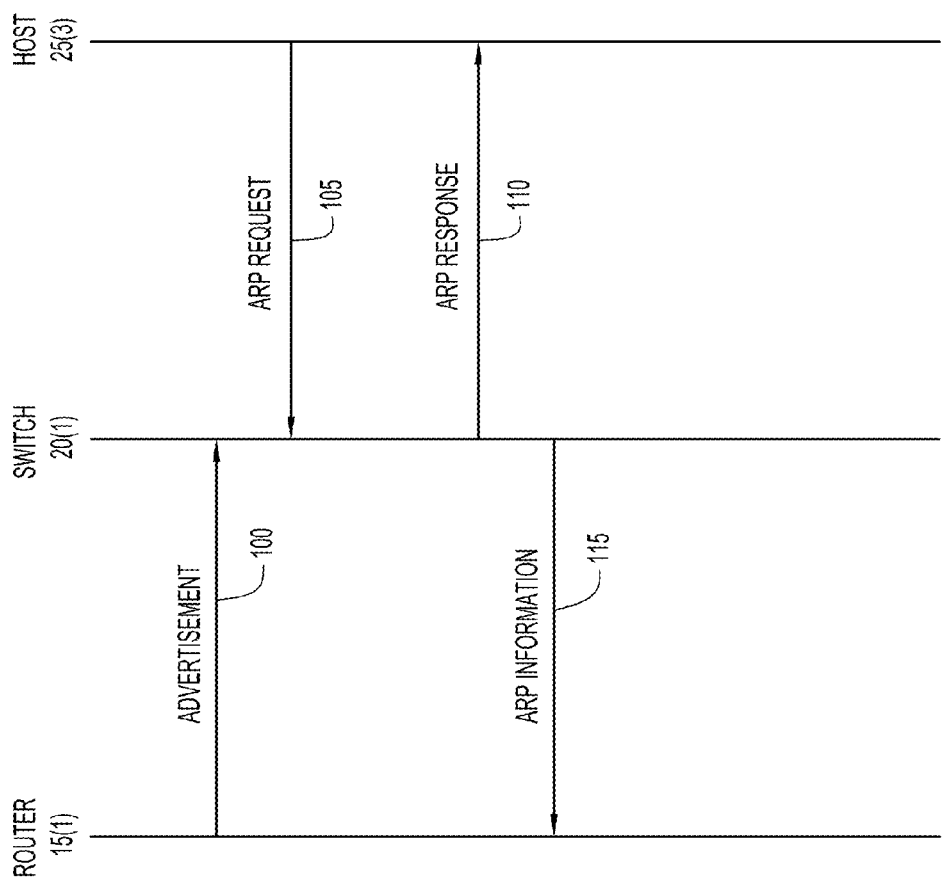
FIG. 3 is a schematic flow diagram illustrating the exchange of messages in accordance with the example of FIG. 2.

FIG. 2 is a detailed flowchart illustrating the distributed proxy addressing techniques in accordance with examples described herein. FIG. 3 is a flow diagram that schematically illustrates messages exchanged according to the distributed proxy addressing techniques of FIG. 2. The examples of FIGS. 2 and 3 will be described with reference to the network architecture of FIG. 1 and the ARP.

The example of FIG. 2 begins at 50 where one or more of the routers 15(1)-15(3) transmit an advertisement message to extend the proxy addressing functionality to the connecting switches. This advertisement message is illustrated by arrow 100 in FIG. 3 and may be transmitted via a well known multicast address to switches 20(1)-20(3) and/or switches 22(1)-22(3). The advertisement message may include several pieces of information. First, the advertisement message may include a capability-type that indicates if the receiving switch should just inspect (snoop) received ARP requests silently (i.e., perform host discovery) or also respond to ARP requests (i.e., perform ARP proxy operations). Second, the advertisement message may include a router MAC address for the network. This router MAC address is included to allow a switch to respond to an ARP request on behalf of a router. Third, the advertisement message may include an indication of the VLAN for which this ARP proxy capability is enabled. Fourth, the advertisement message may include the callback address (MAC address, or an IP address, with control VLAN) for the router. This may be used by the switch to communicate with a router and provide the router with the results of the host discovery (i.e., provide ARP proxy information back to router).

It is to be appreciated that, in certain examples, the operations at 50 may be omitted. Instead, the information contained in the advertisement message may be pre-configured and stored on the switches via, for example, a command-line interface (CLI). It would be appreciated that the advertisement message or the pre-configured information may include other elements to enhance the distributed proxy addressing techniques.

For ease of illustration, the operations performed after receipt of the advertisement message in FIG. 2 will be described with reference to the single switch 20(1) and router 15(1). It is to be appreciated that such operations may also be performed with reference to the other switches 20(2)-20(3) and virtual switches 22(1) and 22(2).

At 55, the switch 20(1) initiates an addressing redirection mechanism that enables the switch to perform the distributed proxy addressing operations. More specifically, the addressing redirection mechanism is configured to forward (copy and/or redirect) received ARP requests for inspection by the switch 20(1). To initiate the addressing redirection mechanism, the switch 20(1) activates (e.g., installs, accesses, etc.) an access-control-list that forwards the ARP requests to the control processing logic of the switch 20(1). The type of access-control-list that is activated may be dependent upon the capability-type in the router advertisement message or as pre-configured on the switch.

At 60, an ARP request is received at switch 20(1) from a first host, such as host 25(3). This ARP request is represented in FIG. 3 by arrow 105. When this ARP request is received, the switch 20(1) will perform one or more distributed proxy addressing operations, depending on the capability-type. In the example of FIG. 2, the capability-type is such that the switch 20(1) is configured to perform the extended host discovery operations and the extended proxy addressing operations. Therefore, at 65 the switch 20(1) inspects the ARP request to obtain ARP information for host 25(3). At 70, the switch 20(1) may then respond to the ARP request with an ARP response to provide the host 25(3) with a MAC address for use in subsequent transmissions. This ARP response is illustrated in FIG. 3 by arrow 110. As described above, this ARP response provides the host 25(3) with the network designated router MAC address advertised by router 15(1) in the router advertisement or a configured value on the switch.

Next, at 75, switch 20(1) caches (stores) the host ARP information obtained through the inspection operations and, at 80, the switch sends this information to the connected router 15(1). It would be appreciated that switch 20(1) may collect and store a predetermined or selected amount of ARP information before transmitting the information back to the router 15(1). Alternatively, switch 20(1) may transmit the collected ARP information back to router 15(1) as it is collected. The transmission of the ARP information is schematically shown in FIG. 3 by arrow 115. At 85, router 15(1) uses the ARP information received from switch 20(1) to propagate the ARP information of host 25(3) through the network 10.

It is to be appreciated that distributed proxy addressing operations may be performed at switches that are not directly connected to a router. For example, the distributed proxy addressing operations could be performed on a switch that is a few network hops away from a router.

Figure 4:
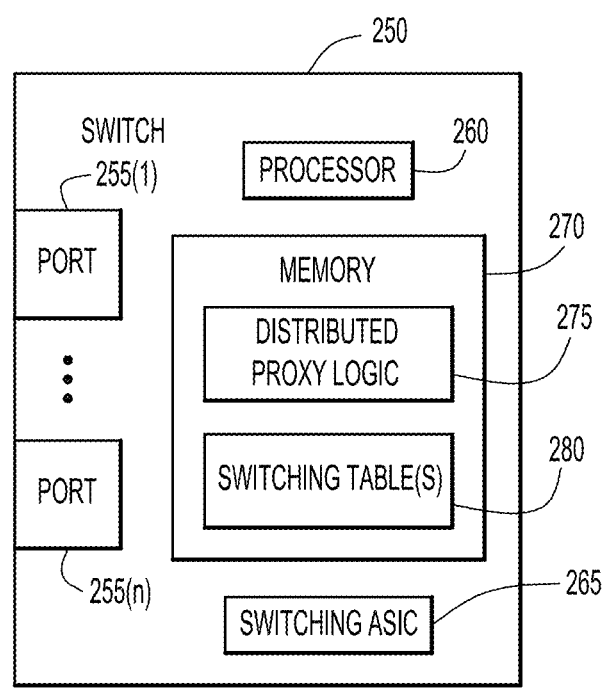
FIG. 4 is a block diagram of a switch configured to execute proxy addressing operations on the behalf of a connected router.

A number of different transport protocols may be used for the router advertisement message and to forward the ARP information back to a router 15. For example, these transport protocols may be an IP layer transport or a Layer 2 transport. The details of the various useable transport protocols are not described in detail herein FIG. 4 is a functional block diagram of a switch 250 configured to execute distributed proxy addressing operations in accordance with aspects described herein. As shown, switch 250 comprises a plurality of ports 255(1)-255(n), a processor 260, a switching application specific integrated circuit (ASIC) 265, and a memory 270. The switching ASIC 265 is a hardware device that performs the various queuing, hashing and other networking switching operations. Memory 270 stores instructions for one or more software modules including distributed proxy logic 275, and one or more switching tables 280. Memory 270 may comprise read only memory (ROM), random access memory (RAM), magnetic disk storage media devices, optical storage media devices, flash memory devices, electrical, optical, or other physical/tangible (e.g., non-transitory) memory storage devices. The processor 260 is, for example, a microprocessor or microcontroller that executes instructions for the distributed proxy logic 275. Thus, in general, the memory 270 may comprise one or more tangible computer readable storage media (e.g., a memory device) encoded with software comprising computer executable instructions and when the software is executed (by the processor 260) it is operable to perform the operations described herein for execution of the distributed proxy addressing techniques.

More specifically, the distributed proxy logic 275 includes instructions that, when executed by processor 260, are operable to perform several operations. For example, the distributed proxy logic 275 may include instructions operable to perform the packet inspection and address determination operations. The distributed proxy logic 275 may also include instructions operable to store addressing information and provide the addressing information to a connected router. The distributed proxy logic 275 may also include instructions operable to respond to address (e.g., ARP) requests.

Figure 5:
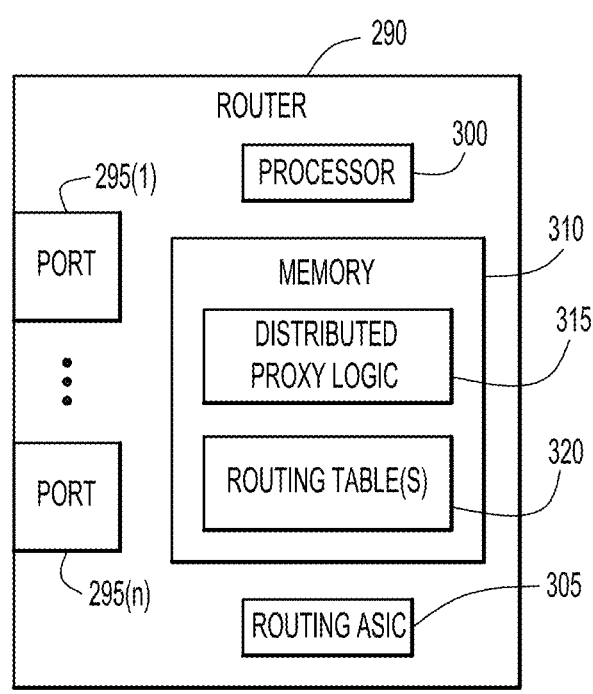
FIG. 5 is a block diagram of a router configured to enable a connected switch to execute proxy addressing operations.

FIG. 5 is a functional block diagram of a router 290 configured to execute distributed proxy addressing operations in accordance with aspects described herein. As shown, router 290 comprises a plurality of ports 295(1)-295(n), a processor 300, a routing application specific integrated circuit (ASIC) 305, and a memory 310. The routing ASIC 305 is a hardware device that performs the various packet forwarding/routing operations. Memory 310 stores instructions for one or more software modules including distributed proxy logic 315 and one or more routing tables 320. Memory 310 may comprise read only memory (ROM), random access memory (RAM), magnetic disk storage media devices, optical storage media devices, flash memory devices, electrical, optical, or other physical/tangible (e.g., non-transitory) memory storage devices. The processor 300 is, for example, a microprocessor or microcontroller that executes instructions for the distributed proxy logic 315. Thus, in general, the memory 310 may comprise one or more tangible computer readable storage media (e.g., a memory device) encoded with software comprising computer executable instructions and when the software is executed (by the processor 300) it is operable to perform the operations described herein for execution of the distributed proxy addressing techniques.

More specifically, the distributed proxy logic 315 includes instructions that, when executed by processor 300, are operable to perform several operations. For example, the distributed proxy logic 315 may first include instructions operable to determine when the distributed proxy addressing techniques should be implemented within the network. In other words, the distributed proxy logic 315 enables the router 290 to determine that there are hosts for which the router is unaware and for which the router cannot operate as the proxy. The distributed proxy logic 315 may further include instructions operable to generate the advertisement message described above and forward the advertisement message to one or more switches connected (directly or indirectly) to the router 290. The distributed proxy logic 315 may also include instructions operable to enable the router 290 to receive addressing (e.g., ARP) information from the switches.

Figure 6:
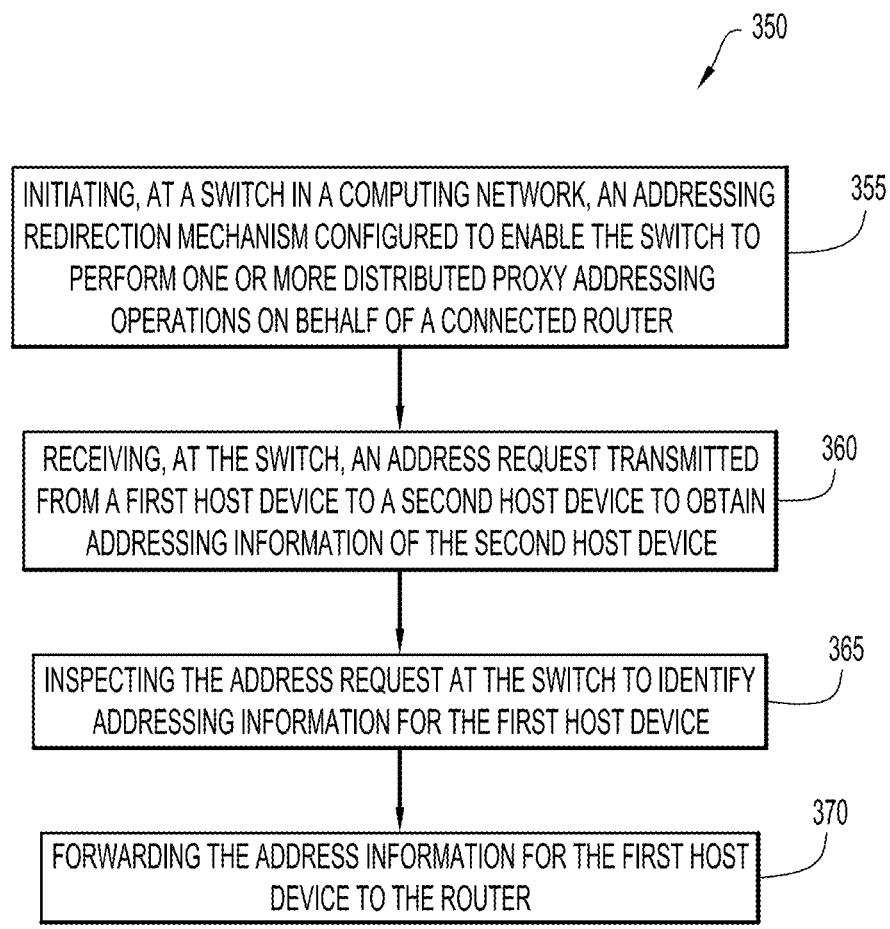
FIG. 6 is a high-level flowchart of a method executed in accordance with examples described herein.

FIG. 6 is a flowchart illustrating an example method 350 executed in accordance with the distributed proxy addressing techniques described herein. Method 350 begins at 355 where a switch initiates an addressing redirection mechanism configured to enable the switch to perform one or more distributed proxy addressing operations on behalf of a connected router. At 360, the switch receives an address request transmitted from a first host device to a second host device. The address request is transmitted by the first host device to obtain addressing information of (i.e., the MAC address of) the second host device. At 365, the switch inspects the address request to identify addressing information for the first host device. At 370, the switch forwards the addressing information for the first host device to the router.

Described herein are techniques for extending a router's proxy addressing functionality (e.g., proxy-ARP or proxy-NDP functionality) to switches connected (directly or indirectly) to the router so that the switches may operate as proxy agents on behalf of the router. The disclosed techniques reduce the processing load on a routing device and enhance host location determination that could be used to help scale data center networks.

The above description is intended by way of example only.

What is claimed is:

1. A method comprising:
   initiating, at a switch in a computing network, an addressing redirection mechanism configured to enable the switch to perform one or more distributed proxy addressing operations on behalf of a connected router;
   receiving, at the switch, an address request transmitted from a first host device to a second host device to obtain addressing information of the second host device;
   inspecting the address request at the switch to identify addressing information for the first host device; and
   forwarding the addressing information for the first host device to the router.

2. The method of claim 1, wherein the address request is transmitted to obtain a Media Access Control (MAC) address for the second host device, and wherein transmitting the address response from the switch to the first host device comprises:
   transmitting an address response from the switch to the first host device to provide the first host device with a network router MAC address.

3. The method of claim 1, further comprising:
   prior to initiating the addressing redirection mechanism, receiving an advertisement message from the router to extend proxy addressing operation to the switch.

4. The method of claim 3, wherein receiving the advertisement message comprises:
   receiving an advertisement message that includes a capability-type indicating whether the switch should only inspect received address requests or also respond to received address requests.

5. The method of claim 3, wherein receiving the advertisement message further comprises:
   receiving an advertisement message that includes one or more of a MAC address of the router or a callback address of the router.

6. The method of claim 1, wherein initiating the addressing redirection mechanism comprises:
   activating an access-control-list configured to forward the received address request to a control processing plane of the switch for inspection.

7. The method of claim 1, further comprising:
   storing the address information for the first host device for a period of time prior to transmitting the address information to the router.

8. The method of claim 1, wherein receiving the address request comprises:
   receiving a Address Resolution Protocol (ARP) request, and wherein the address response is an ARP response.

9. The method of claim 1, wherein receiving the address request comprises:
   receiving a Network Discovery Protocol (NDP) request, and wherein the address response is an NDP response.

10. An apparatus comprising:
    a plurality of network ports;
    a memory; and
    a processor configured to:
       initiate an addressing redirection mechanism configured to enable the apparatus to perform one or more distributed proxy addressing operations on behalf of a connected router;
       receive, via a first network port, an address request transmitted from a first host device to a second host device to obtain addressing information of the second host device;
       inspect the address request to identify addressing information for the first host device; and
       forwarding the addressing information for the first host device to the router via a second network port.

11. The apparatus of claim 10, wherein the address request is transmitted to obtain a Media Access Control (MAC)

address for the second host device, and wherein the processor is configured to transmit an address response to the first host device to provide the first host device with a network router MAC address.

12. The apparatus of claim 10, wherein prior to initiating the addressing redirection mechanism, the processor is configured to receive an advertisement message from the router to extend proxy addressing operation to the apparatus.

13. The apparatus of claim 12, wherein the advertisement message further includes a capability-type indicating whether the processor should only inspect received address requests or also respond to received address requests.

14. The apparatus of claim 12, wherein the advertisement message further includes one or more of a MAC address of the router or a callback address of the router.

15. The apparatus of claim 10, wherein initiating the addressing redirection mechanism comprises:
activating an access-control-list configured to forward received address requests to a control processing plane for inspection.

16. The apparatus of claim 10, wherein the processor is configured to store the addressing information of the first host device for a period of time in the memory prior to transmitting the ARP information to the router.

17. The apparatus of claim 10, wherein the processor is configured to receive a Address Resolution Protocol (ARP) request and transmit an ARP response.

18. The apparatus of claim 10, wherein the processor is configured to receive a Network Discovery Protocol (NDP) request and transmit an NDP response.

19. The apparatus of claim 10, wherein the apparatus is a physical switch.

20. The apparatus of claim 10, wherein the apparatus is a virtual switch residing within a physical server.

21. One or more non-transitory computer readable storage media encoded with software comprising computer executable instructions and when the software is executed operable to:
initiate, at a switch in a computing network, an addressing redirection mechanism configured to enable the switch to perform one or more distributed proxy addressing operations on behalf of a connected router;
receive, at the switch, an address request transmitted from a first host device to a second host device to obtain addressing information of the second host device;
inspect the address request at the switch to identify addressing information for the first host device; and
forward the addressing information for the first host device to the router.

22. The non-transitory computer readable storage media of claim 21, wherein the address request is transmitted to obtain a Media Access Control (MAC) address for the second host device, and wherein the instructions operable to transmit the address response from the switch to the first host device comprise instructions operable to:
transmit an address response from the switch to the first host device to provide the first host device with a network designated router MAC address.

23. The non-transitory computer readable storage media of claim 21, further comprising instructions operable to:
prior to initiating the addressing redirection mechanism, receive an advertisement message from the router to extend proxy addressing operation to the switch.

24. The non-transitory computer readable storage media of claim 23, wherein the instructions operable to receive the advertisement message comprise instructions operable to:
receive an advertisement message that includes a capability-type indicating whether the switch should only inspect received address requests or also respond to received address requests.

25. The non-transitory computer readable storage media of claim 23, wherein the instructions operable to receive the advertisement message comprise instructions operable to:
receive an advertisement message that includes one or more of a MAC address of the router or a callback address of the router.

26. The non-transitory computer readable storage media of claim 21, wherein the instructions operable to initiate the addressing redirection mechanism comprise instructions operable to:
activate an access-control-list configured to forward received address requests to a control processing plane of the switch for inspection.

27. The non-transitory computer readable storage media of claim 21, further comprising instructions operable to:
store the addressing information for the first host device for a period of time prior to transmitting the addressing information to the router.

28. The non-transitory computer readable storage media of claim 21, wherein the instructions operable to receive the address request comprise instructions operable to:
receive a Address Resolution Protocol (ARP) request, and wherein the address response is an ARP response.

29. The non-transitory computer readable storage media of claim 21, wherein the instructions operable to receive the address request comprise instructions operable to:
receive a Network Discovery Protocol (NDP) request, and wherein the address response is an NDP response.

* * * * *